(12) United States Patent
Dobler et al.

(10) Patent No.: US 6,220,826 B1
(45) Date of Patent: *Apr. 24, 2001

(54) FUEL DELIVERY UNIT

(75) Inventors: Klaus Dobler; Michael Huebel, both of Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/402,069

(22) PCT Filed: Feb. 9, 1999

(86) PCT No.: PCT/DE99/00343

§ 371 Date: Sep. 28, 1999

§ 102(e) Date: Sep. 28, 1999

(87) PCT Pub. No.: WO99/41504

PCT Pub. Date: Aug. 19, 1999

(30) Foreign Application Priority Data

Feb. 12, 1998 (DE) .............................................. 198 05 777

(51) Int. Cl.[7] .................................................. F04B 17/00
(52) U.S. Cl. ..................... 417/356; 417/423.7; 415/55.1; 416/3
(58) Field of Search ................................. 417/356, 423.7; 415/55.1, 55.2, 55.3, 55.4; 416/3

(56) References Cited

U.S. PATENT DOCUMENTS 5,659,217 * 8/1997 Petersen ................................ 310/156

FOREIGN PATENT DOCUMENTS 40 20 521 A1  1/1992  (DE) .
WO 95/25885  9/1995  (WO) .

* cited by examiner

*Primary Examiner*—Charles G. Freay
*Assistant Examiner*—Cheryl J. Tyler
(74) *Attorney, Agent, or Firm*—Michael J. Striker

(57) ABSTRACT

A delivery unit for motor fuel includes a side channel pump and an electric motor that drives the side channel pump. The electric motor has an armature winding, a permanent magnet (37), and a rotor (29). The rotor (29) and the impeller (16) of the side channel pump are a single component, and the permanent magnet (37) is inserted with positive engagement into a circumference (35) of this component. This allows the production of an especially low-height, low-leakage side channel pump.

14 Claims, 3 Drawing Sheets

FUEL DELIVERY UNIT

BACKGROUND OF THE INVENTION

The invention relates to a delivery unit for motor fuel.

In a known delivery unit of this type for pumping motor fuel from a fuel tank to an internal combustion engine of a motor vehicle (International Patent Disclosure WO 95/25885), the feed pump and the electric motor for driving it are disposed side by side in the same housing. The pump wheel or impeller, which is occupied with vanes or impeller blades on its circumference, is seated in a manner fixed against relative rotation on a shaft of the rotor or impeller; this rotor or impeller carries a rotor or armature winding resting in slots, and it revolves in a stator occupied by permanent magnet segments. The delivery of electrical current to the armature winding is made via a commutator, seated on the rotor shaft, and via two current brushes resting radially on the commutator with spring pressure.

SUMMARY OF THE INVENTION

It is therefore an object of the present invention to provide a delivery unit for motor fuel which avoids the disadvantages of the prior art.

In keeping with these objects, one feature of present invention resides, briefly stated, in a delivery unit for motor fuel, in which a rotor and an impeller of a side channel pump are a single component, and a permanent magnet is inserted with positive engagement on a circumference of this component.

The delivery unit for motor fuel according to the invention and has the advantage that by combining the rotating parts of the delivery unit, that is, the impeller of the feed pump and the rotor of the electric motor, into a single part, a very simple and compact construction is attained that can be produced with little engineering effort. In particular, the delivery unit can be made quite flat, or in other words with an extremely slight axial dimension. The resultant increased outer diameter of the delivery unit, in conjunction with the conventional embodiment of the delivery unit, is not only not a disadvantage but in fact affords the possibility of making additional provisions to improve the efficiency of the delivery unit. By dispensing with a commutator and current brushes, brush wear is no longer a factor, so that the service life of the delivery unit is increased. If the electric motor is embodied as a direct current motor, the requisite commutation of the current is performed electronically in the stator winding.

In a preferred embodiment of the invention, the cylindrical pump chamber is defined by two radially extending, axially spaced-apart side walls and one peripheral wall that joins the two side walls together along their circular periphery. The impeller faces each of the side walls with gap spacing, and the inner surface of the stator, formed by a slotted lamination packet, forms the peripheral wall of the pump chamber. The impeller has many circumferentially spaced-apart radial impeller blades that between them define axially open blade chambers and that are joined to one another by an outer ring. The permanent magnets are secured to the outer ring and, if the delivery unit is made of plastic, are preferably produced of plastoferrites.

As an alternative to this, plastic-bonded rare-earth magnets can be employed, which are preferably embedded into the plastic matrix of the impeller.

In an advantageous embodiment of the invention, a groove-like side channel open toward the pump chamber is embodied in each side wall of the pump chamber, concentrically with the impeller axis, and having an interrupter rib that remains between the end of the side channel and the beginning of the side channel, in terms of the flow direction. The beginning of at least one side channel communicates with an intake opening, and the end of the side channel communicates with a pressure outlet, and the axis of the inflow and outflow channels are oriented either axially or preferably radially from the intake opening and to the pressure outlet. Because of the especially advantageous radial inflow and outflow of fuel into and out of the pump chamber, a substantial reduction in flow losses is attained, and the pump efficiency is thus improved. In contrast to the conventional side channel pumps, the radial inflow and outflow is possible without problems, because of the outer diameter of the delivery unit that has been increased because of the design according to the invention, since as a result there is sufficient insulation space available in the radial direction to accommodate appropriate inflow and outflow channels.

BRIEF DESCRIPTION OF THE DRAWING

The invention is described in further detail in the ensuing description in terms of an exemplary embodiment shown in the drawing. The drawing schematically shows.

DESCRIPTION OF PREFERRED EMBODIMENT

Figure 1:
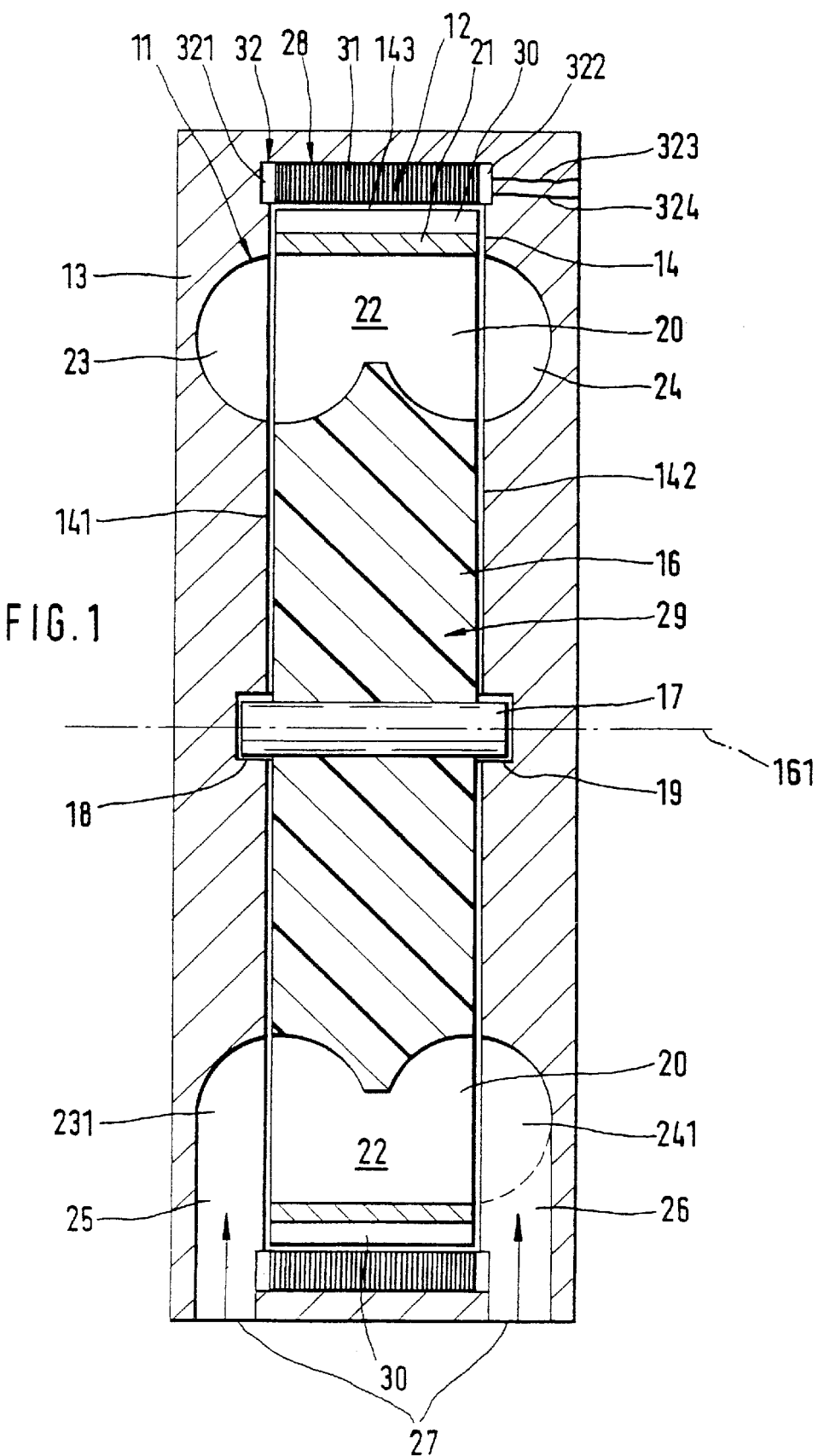
FIG. 1, a longitudinal or meridial section of the delivery unit, with the section in the upper half of the drawing being taken through the flow region formed and in the lower half of the drawing through the intake region of the delivery unit.

The delivery unit schematically shown in FIG. 1 serves to deliver motor fuel from a tank to the internal combustion engine of a motor vehicle. Typically, the delivery unit in conjunction with a filter pot is disposed as a so-called built-in tank unit in the fuel container or tank of the motor vehicle. The delivery unit has a feed pump 11, embodied as a flow pump or a side channel pump, and an electric motor 12 that drives the feed pump 11. The feed pump 11 and the electric motor 12 are received in a common housing 13. The structure and mode of operation of the feed pump 11 are known and are described for instance in German Patent Disclosure DE 40 20 521 A1. A pump chamber 14 is embodied in the housing and is defined in the axial direction by two radially extending, axially spaced-apart side walls 141, 142 and in the circumferential direction by a peripheral wall 143 joining the two side walls 141, 142 to one another along their circular periphery. A pump wheel or impeller 16 is disposed in the pump chamber 14 and is seated on a shaft 17 in a manner fixed against relative rotation. The shaft 17 is received with both of its ends in two bearings 18, 19, which are embodied in the two side walls 141, 142. The axis of the shaft 17 is colinear with the impeller axis 161 and the axis of the pump chamber 14. The impeller 16 has many circumferentially spaced-apart radial impeller blades 20, only two of which can be seen in the drawing. The impeller blades 20 are joined together by an outer ring 21. Each two impeller blades 20 between them define a blade chamber 22, which is axially open. The impeller 16 faces the side walls 141, 142 with gap spacing between them, and the outer ring 21 together with the peripheral wall 143 of the pump chamber 14 forms a radial gap. In each side wall 141, 142 of the pump chamber 14, a slot-like side channel 23 and 24, respectively, is formed that is open toward the pump chamber 14 and disposed concentrically with the impeller axis 161; an interrupter rib remains in the circumferential direction over virtually 330 from the beginning of a side channel. In the drawing, only the beginnings 231 and 241 of the side channels 23, 24 can be seen in the lower sectional view. The end of the side channel, by comparison, is offset by a circumferential angle of approximately 330°. Each side channel 23, 24 communicates, via a radially oriented inflow channel 25 and 26, respectively, with an intake opening 27 of the delivery unit. The ends, not visible here, of the two side channels 23, 24 each communicate via a respective outflow conduit with a pressure neck of the delivery unit. In an alternative embodiment of the invention, only the beginning 231 of the side channel 23 communicates with an inflow channel 25, and only the end of the side channel 24 communicates with an outflow conduit. In that case, the inflow conduit 26 on the right in the sectional view is omitted, and in this region the side channel 24 has a cross section as indicated in the drawing by dashed lines. The inflow channels 25, 26 can furthermore be disposed axially as well, but the radial orientation has the advantage of lesser flow losses and is easy to achieve, because of the relatively large outer diameter of the delivery unit.

The electric motor 12, embodied with a so-called inner-pull rotor, has a stator 28 and a rotor 29 in a known manner; to achieve an extremely shallow design of the delivery unit, the rotor is integrated with the impeller 16 of the feed pump 11. Its magnetic pulls are formed by permanent magnet segments 30, which are secured to the outer ring 21 of the impeller 16. For attaining a favorable magnetic return path, the outer ring 21 is preferably embodied of servomagnetic material. The stator 28 is disposed as a slotted lamination packet 31 coaxially to the impeller axis 161 and the housing 13, in such a way that the inner annular face of the lamination packet 31 forms the peripheral wall 143 of the pump chamber 14. An armature winding 32 is typically disposed in the slots of the lamination packet 31; in the schematic drawing, all that can be seen of this armature winding is the two face-end winding heads 321 and 322 and the two connecting lines 323 and 324. In the case of a direct-current drive, the electric motor 12 is commutated electronically.

If the impeller 16 of the feed pump 11 is made of plastic, then it is advantageous from a production standpoint if the permanent magnet segments 30 are made from plastoferrites or are plastic-bonded rare-earth magnets.

Figure 2:
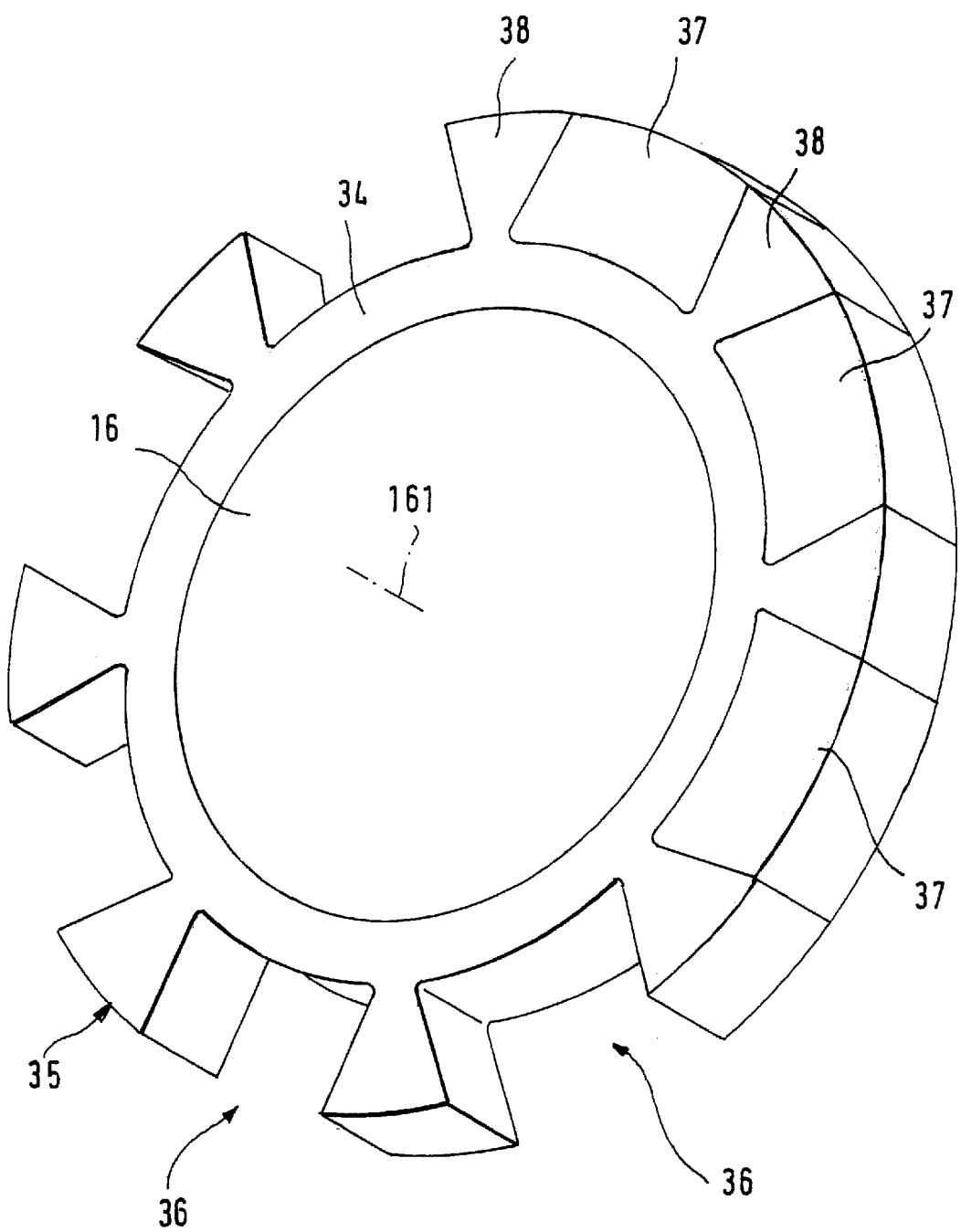
FIG. 2, an oblique top view of an impeller.

FIG. 2 shows the impeller 16 of FIG. 1 in a plan view obliquely from above. The impeller blades 20 of FIG. 1 are not shown here in FIG. 2 in an indentation 34 extending in a circle around the impeller axis 161. Conversely, recesses 36 are shown, disposed on a circumference 35 of the impeller 16. In this impeller 16, the recesses 36 extend across its entire thickness. Permanent magnets 37 are located in the recesses 36. These permanent magnets are preferably made from a hard ferrite magnet. The permanent magnets 37 are inserted with positive engagement into the recesses 36. To that end, a permanent magnet 37 have inclined sides. This is repeated in negative form in the shaping of the recess 36. This shape offers the advantage that with the impeller 16 in rotation, the centrifugal forces assure that a clamping force will develop or be amplified between the permanent magnets 37 and the adjacent ribs 38. In this way, the permanent magnets 37 are held all the more firmly, the higher the speed of revolution of the impeller 16. Besides the inclined sides the permanent magnets 37 may have a different outer shape as well, for instance being in the form of stair steps, a ball-or barrel-shaped portion, or a portion of a cylinder. However, the selected shape, in cooperation with the ribs 38, should be capable of exploiting centrifugal force to develop a clamping force. Instead of mounting the permanent magnets 37 by means of ribs 38, this can also be accomplished by other types of recesses 36. In that case, the recesses 36 should be designed such that their outer shape conforms to the shape of the permanent magnets 37. As a result, it is unnecessary to use other components for additionally securing the permanent magnets 37 to the impeller 16.

Figure 3:
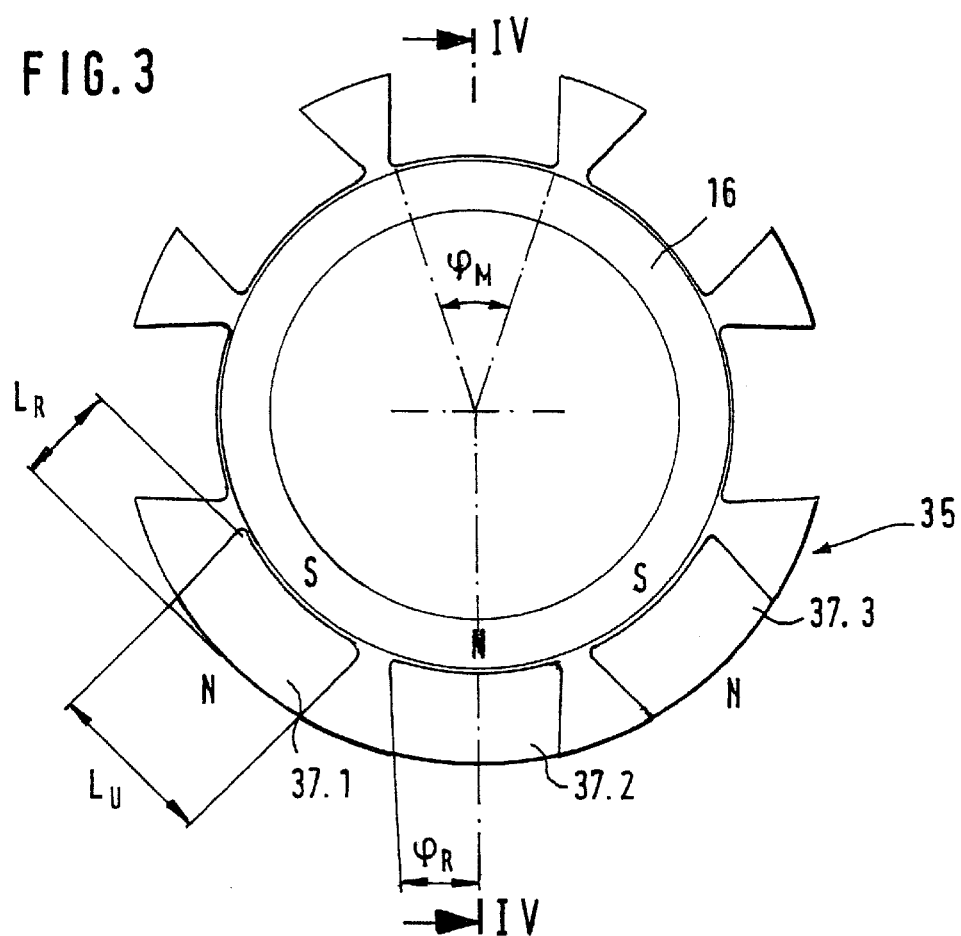
FIG. 3, a plan view of the impeller of FIG. 1.

FIG. 3 shows the impeller 16 of FIG. 2 in a plan view from above. Preferably, between 16 and 12 permanent magnets 37 are disposed on the circumference 35 in the impeller 6. As a result, the permanent magnets 37 can have a circumferential length $L_U$ on the circumference 35 that makes for adequate acceleration by the electromagnetic forces of interaction with the stator. A radial length $L_R$ of the permanent magnet 37 that is in a ratio with the circumferential length $L_U$ of $L_U/L_R$ between 0.75 and 3.5 is preferred. This offers the advantage that demagnetizing effects between the permanent magnets 37 are prevented. In FIG. 3, three permanent magnets 37.1, 37.2, 37.3 are shown. A first permanent magnet 37.1 and a third permanent magnet 37.3 have the same pole orientation, while the second permanent magnet 37.2 located between them has the opposite polarity. Because of the conical shape shown, it is successfully possible to utilize virtually the entire circumference 35 of the impeller 16 for transmitting the requisite torque. It has proved to be advantageous if an arc angle $\psi_M$ of the circumference 35 that one permanent magnet 37 occupies is no greater than 360 divided by (p+1). Here p indicates the number of permanent magnets 37 on the impeller 16. If this rule is adhered to, it is possible to utilize a large proportion of the circumference 35, without having to make sacrifices in terms of the strength of the impeller 16 and thus limitations to the speed of revolution of the impeller 16. In the conical or cone-like shape of the permanent magnets 37, the goal is a friction angle $\psi_R$ of 2° to 12°. An angle of 3° to 5° is preferably sought. It is thus possible to increase the extremely high degree of utilization of the circumference 35 for furnishing the permanent magnets 37 even further. Furthermore, the cone-like form of the permanent magnets 37, in a refinement, enables them to hold in the recesses 36 without having to be adhesively bonded there. This in turn saves one work step.

The material that forms the recesses 36 is preferably selected to be elastic or plastic, for example in order to establish a slight press fit. Between the permanent magnets 37 and the dimensions of the recesses 36, a clamping force then necessarily develops. Such a press fit also enables easy mounting of the permanent magnets 37 in the impeller 16 so that the rotor and the impeller 16 can be made as a built-in component.

Figure 4:
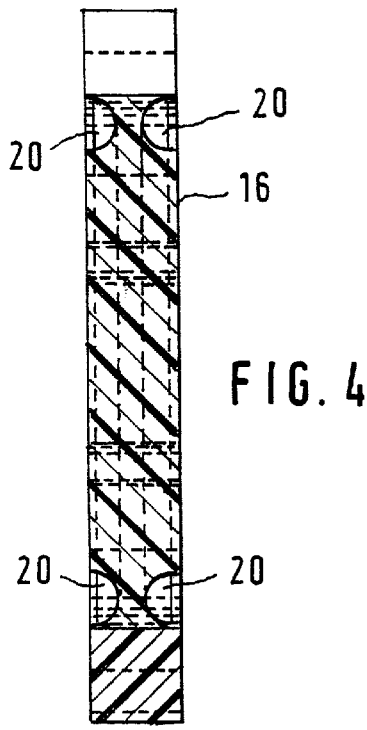
FIG. 4, an oblique section through the impeller of FIG. 3 taken along the line IV—IV.

FIG. 4 shows the impeller 16 of FIG. 3 in a cross section taken along the line IV—IV. In this cross section the impeller blades 20 are shown. This cross section clearly shows that the permanent magnets 37 can be either directly jointly cast or jointly injection molded in the production of the impeller. Since the impeller 16 itself is made of a plastic, then with suitable production of the tools required for this, the course of production makes it possible to produce the impeller and the rotor in one component in one piece in a single work step. Alternatively, it is possible to use plastic-bonded rare-earth magnets.

Figure 5:
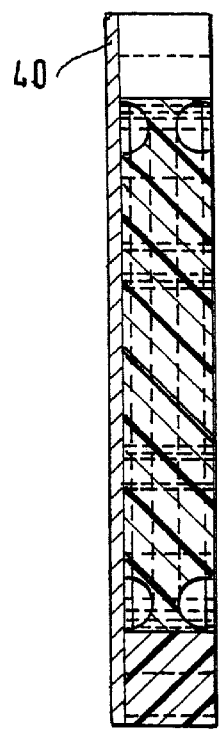
FIG. 5, a second impeller, with a stop.

FIG. 5, in an analogy to FIG. 4, shows a second impeller with a stop 40. If the second impeller 39 is produced first, for instance, then the permanent magnets 37 in an ensuing step need merely be thrust into the respective recesses up to the stop 40. Naturally, the stop must be designed such that the formation of side channels, as shown in FIG. 1, is not hindered.

With the structural versions described, very close tolerances can be attained on the impeller periphery in production. In the principle of the side channel pump present here, a motor fuel delivery unit can thus be produced that has only extremely limited leakage losses.

What is claimed is:

1. A delivery unit for motor fuel, comprising a side channel pump having an impeller; an electric motor which drives said side channel pump, said electric motor having an armature winding, a permanent magnet and a rotor, said rotor of said electric motor and said impeller of said side channel pump forming a single component; and a permanent magnet inserted with a positive engagement on a circumference of said component.

2. A delivery unit as defined in claim 1, wherein said permanent magnet of said electric motor has inclined sides.

3. A delivery unit as defined in claim 2, wherein said permanent magnet is a hard ferrite magnet.

4. A delivery unit as defined in claim 1, wherein said permanent magnet includes 6–12 permanent magnet elements distributed over a circumference of said impeller.

5. A delivery unit as defined in claim 1, wherein said permanent magnet occupies an arc angle of said circumference, which is not greater than $360°/(p+1)$.

6. A delivery unit as defined in claim 1, wherein said component has a recess which conforms to an outer shape of said permanent magnet.

7. A delivery unit as defined in claim 6, wherein said recess is formed of a material selected from the group consisting of an elastic material and a plastic material.

8. A delivery unit as defined in claim 6, wherein said component has a stop, said permanent magnet is inserted into said recess as far as said stop of said component.

9. A delivery unit as defined in claim 6, wherein said permanent magnet is non-adhesively held in said recess.

10. A delivery unit as defined in claim 6, wherein said permanent magnet is clamped in place in said recess.

11. A delivery unit as defined in claim 1, wherein said permanent magnet has a ratio of a circumferential length to a radial length substantially between 0.75 and 3.5.

12. A delivery unit as defined in claim 1, wherein said permanent magnet is embedded in said impeller jointly in casting process.

13. A delivery unit as defined in claim 1, wherein said permanent magnet is inserted in said impeller jointly in injection molding process.

14. A delivery unit as defined in claim 1, wherein said permanent magnet is a plastic-bonded rare-earth magnet.

* * * * *